United States Patent [19]

Nakazawa

[11] Patent Number: 5,394,063
[45] Date of Patent: Feb. 28, 1995

[54] VIDEO LIGHT APPARATUS

[75] Inventor: Ryoji Nakazawa, Kanagawa, Japan

[73] Assignee: Sony Corporation, Japan

[21] Appl. No.: 147,427

[22] Filed: Nov. 5, 1993

Related U.S. Application Data

[63] Continuation of Ser. No. 850,966, Mar. 11, 1992, abandoned.

[30] Foreign Application Priority Data

Mar. 20, 1991 [JP] Japan ................................ 3-081947
Mar. 22, 1991 [JP] Japan ................................ 3-083299

[51] Int. Cl.[6] ...................... H05B 39/02; G03B 15/00
[52] U.S. Cl. ......................................... 315/159; 315/33;
315/127; 250/214 P; 250/214 SW; 362/4;
362/9
[58] Field of Search ................. 315/33, 119, 127, 158,
315/159, 307, 308; 250/214 P, 214 SW; 362/3,
4, 9; 358/310, 906

[56] References Cited

U.S. PATENT DOCUMENTS

| | | | |
|---|---|---|---|
| 4,851,738 | 7/1989 | Yang | 315/159 |
| 4,902,906 | 2/1990 | Murphy | 315/159 X |
| 4,924,246 | 5/1990 | Yamada | 354/126 |
| 4,928,037 | 5/1990 | Kawabata et al. | 315/127 |
| 4,959,755 | 9/1990 | Hochstein | 362/4 |
| 5,012,392 | 4/1991 | Hochstein | 315/158 X |
| 5,027,035 | 6/1991 | McGrail et al. | 315/127 X |
| 5,073,823 | 12/1991 | Yamada et al. | 358/906 X |
| 5,075,706 | 12/1991 | Miyazaki | 358/906 X |
| 5,095,408 | 3/1992 | Chen | 362/9 |

FOREIGN PATENT DOCUMENTS

0406687 1/1991 European Pat. Off. .

Primary Examiner—David Mis
Attorney, Agent, or Firm—Ronald P. Kananen

[57] ABSTRACT

A reed switch is provided between a video camera and a battery pack circuit section. A current flowing when the video camera operates is detected by the reed switch. A video light is turned on or off on the basis of the detected current value. When the power source does not reach a specified voltage, the video light is turned off. The outer light amount when photographing is converted into an electric current by a phototransistor. When the current is less than a threshold level, the video light is lit or turned on. The threshold level is varied by a variable resistor.

22 Claims, 7 Drawing Sheets

VIDEO LIGHT APPARATUS

This application is a continuation of application Ser. No. 07/850,966, filed Mar. 11, 1992, now abandoned.

BACKGROUND OF THE INVENTION

1. Field of the Invention

The invention relates to a video light apparatus.

2. Description of the Prior Art

In the case of photographing by using a video camera, there is a fear that when a light amount for an object is low, an object image cannot be recorded. To solve such a problem, there is a video light apparatus in which a cord is connected to a remote control terminal of the video camera and the light is turned on and off.

In the video light apparatus as mentioned above, electric power is supplied from a battery pack of the video camera. When the video light apparatus is continuously used for a long time, the electric power charged in the battery pack decreases to a rated voltage or less and is also remarkably consumed. Thus, photographing becomes impossible. On the other hand, there is a demand such that the video light apparatus is automatically lit on by turning on the power source of the video camera.

OBJECTS AND SUMMARY OF THE INVENTION

It is, therefore, an object of the invention to provide a video light apparatus in which a light is turned on or lighted by turning on a power source of a video camera.

Another object of the invention is to provide a video light apparatus in which a light is turned off in the case where electric power charged in a battery pack is equal to or less than a rated voltage.

Still another object of the invention is to provide a video light apparatus in which a light is turned on in the case where a light amount for an object is low.

According to an aspect of the invention, there is provided a video light apparatus comprising:

a light for lighting an object to be photographed by a video camera, the light being supplied with electric power from a battery which supplies electric power to the video camera; and a current detecting circuit for detecting a current consumption state of the video camera, the supply of the electric power to the light being controlled on the basis of an output signal of the current detecting circuit.

According to another aspect of the invention, the video light apparatus further comprises a voltage detecting circuit for detecting a power source voltage of the battery, wherein when the voltage of the battery is lower than a predetermined voltage, the supply of the electric power to the light is stopped.

According to still another aspect of the invention, there is provided a video light apparatus comprising:

a light for lighting an object to be photographed by a video camera, the light being supplied with electric power from a battery which supplies electric power to the video camera; and an outer light amount detecting circuit for detecting an outer light amount at the time of photographing by the video camera, the supply of the electric power to the light being controlled on the basis of an output signal of the outer light amount detecting circuit.

The above, and other, objects, features and advantage of the present invention will become readily apparent from the following detailed description thereof which is to be read in connection with the accompanying drawings.

BRIEF DESCRIPTION OF THE DRAWINGS

FIG. 3, including

FIG. 4, including

FIG. 5, including

DETAILED DESCRIPTION OF THE PREFERRED EMBODIMENTS

An embodiment of the invention will now be described hereinbelow with reference to the drawings.

Figure 1:
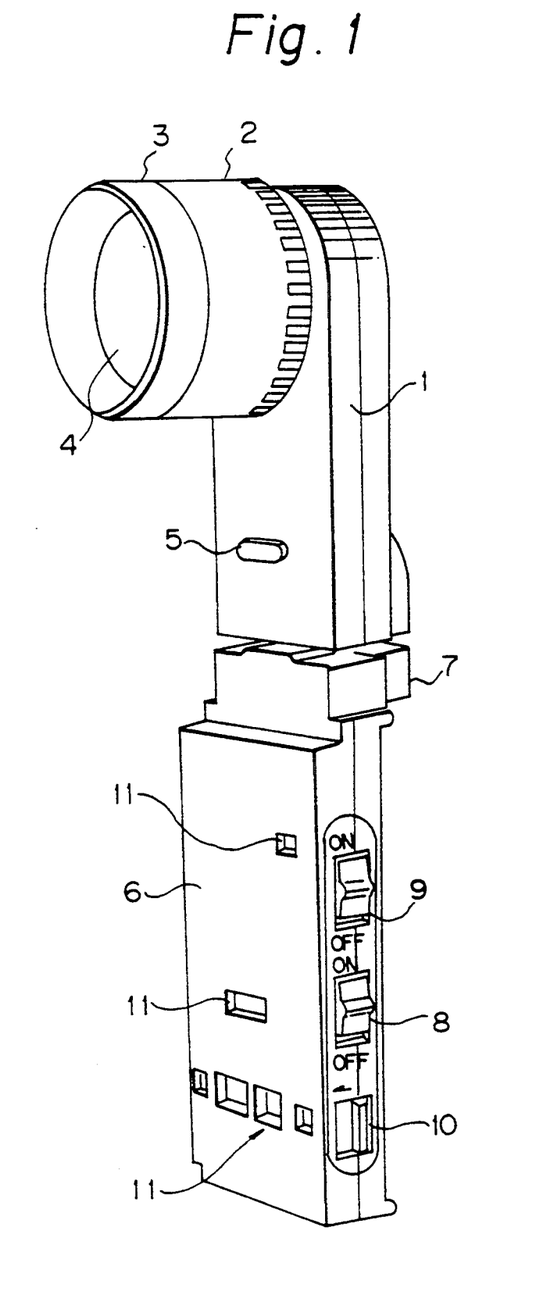
FIG. 1 is a perspective view of a light and an adapter according to an embodiment of the invention.

FIG. 1 is a perspective view showing an embodiment of the invention. In FIG. 1, reference numeral 1 denotes a light. A lens barrel 2 is provided at one end of the light 1. A safety filter 3 is provided at a front edge of the lens barrel 2 and a halogen lamp 4 is provided therein. A release button 5 is provided in the lower portion of the light 1. Reference numeral 6 denotes an adapter. An attaching shoe 7 is provided in the upper portion on the back surface of the adapter 6. A light power switch 8, a current detection on/off switch 9, and a battery lock 10 are respectively provided on the side surface of the adapter 6. A contact pin engagement portion and a lock claw engagement portion which are designated by reference numeral 11 are provided in the front surface of the adapter 6 so as to coincide with a contact pin and a lock claw (both are not shown) of the video camera. A contact pin and a lock claw are also provided in the back surface of the adapter 6 so as to coincide with a contact pin engagement portion and a lock claw engagement portion (both are not shown) of the battery pack.

Figure 2:
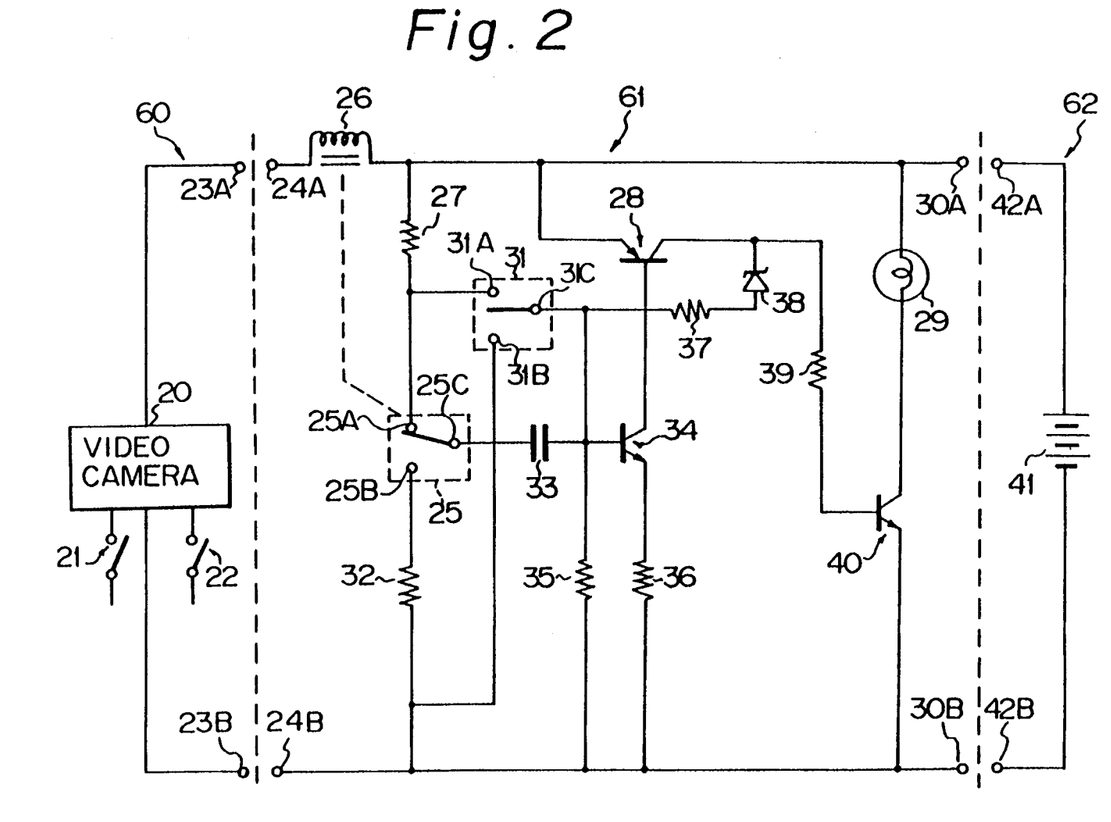
FIG. 2 is a circuit diagram of an embodiment of the invention.

FIG. 2 shows a circuit diagram of a whole system according to an embodiment of the invention and comprises a video camera section 60, an adapter circuit section 61, and a battery pack circuit section 62. In the video camera section 60 in FIG. 2, reference numeral 20 denotes a video camera shown as a block. The video camera 20 has a power on/off switch 21, an REC switch 22, and two connecting terminals 23A and 23B.

In the adapter circuit section 61, reference numerals 24A and 24B denote connecting terminals which are respectively connected to the connecting terminals 23A and 23B. The terminal 24A is connected to one end of a coil 26 of a reed switch 25. The reed switch 25 is operated in accordance with a magnitude of current flowing in the coil 26. The other end of the coil 26 is connected to one end of a resistor 27, an emitter of a transistor 28, one end of a light 29, and a connecting terminal 30A, respectively.

The other end of the resistor 27 is connected to one input terminal 31A of a manual switch 31 and is also connected to one input terminal 25A of the reed switch 25. The manual switch 31 corresponds to the video light power switch 8 in FIG. 1. The other input terminal 25B of the reed switch 25 is connected to the other input terminal 31B of the manual switch 31 through a resistor 32. An output terminal 25C of the reed switch 25 is connected to one end of a capacitor 33. The other end of the capacitor 33 is connected to a base of a transistor 34 and is also connected to one end of a resistor 35 and an output terminal 31C of the manual switch 31. An emitter of the transistor 34 is connected to one end of a resistor 36 and a collector of the transistor 34 is connected to a base of the transistor 28. The output terminal 31C of the manual switch 31 is connected to an anode of a Zener diode 38 through a resistor 37. A cathode of the Zener diode 38 is connected to a collector of the transistor 28.

The collector of the transistor 28 is connected to a base of the transistor 40 through a resistor 39. A collector of the transistor 40 is connected to the other end of the video light 29.

The connecting terminal 24B is connected to the other end of the resistor 32, the other end of the resistor 35, the other end of the resistor 36, an emitter of the transistor 40, and a connecting terminal 30B.

The battery pack circuit section 62 has a power source 41 of, e.g., 6 volts and two connecting terminals 42A and 42B. The connecting terminals 42A and 42B are connected to the connecting terminals 30A and 30B of the adapter circuit section 61.

The operation of an embodiment of the invention will now be described hereinbelow. It is now assumed that all of the connecting terminals are connected.

When the power on/off switch 21 is turned on by the user, the video camera 20 is set into the standby mode. In the standby mode, a very small current flows from the power source 41 to the whole system. Further, when the REC switch 22 is turned on, a large current flows from the power source 41 to the whole system. When the large current flows in the coil 26, the output terminal 25C of the reed switch 25 is connected from the input terminal 25B to the input terminal 25A. Thus, the current is supplied to the base of the transistor 34 through the capacitor 33 and the transistor 34 is turned on. As a result, the transistor 28 connected to the collector of the transistor 34 is turned on. When the transistor 28 is turned on, the transistor 40 is turned on. When the transistor 40 is turned on, a current flows to the collector, so that the light 29 is lit. At the same time, when the transistor 28 is turned on, the Zener diode 38 is turned on so long as a voltage which is applied across the Zener diode 38 is equal to or higher than the Zener voltage. Therefore, since the current is supplied to the base of the transistor 34 through the Zener diode 38 and the resistor 37, the light 29 is continuously lit or turned on. At this time, a circuit between the reed switch 25 and the base of the transistor 34 is cut in a DC manner.

When the REC switch 22 is turned off, the video camera 20 is set into the standby mode from the recording mode. Consequently, the current flowing in the whole system is very small. The output terminal 25C of the reed switch 25 is connected from the input terminal 25A to the input terminal 25B. Therefore, the charges in the capacitor 33 are discharged through the resistor 32 and the base voltage of the transistor 34 is, accordingly, lower than the emitter voltage and the transistor 34 is turned off. Thus, all of the transistors 34, 28, and 40 are turned off and the light 29 is turned off.

When the REC switch 22 is turned on in the case where the current of the battery pack has only an electric power which is equal to or lower than the rated power, the output terminal 25C of the reed switch 25 is connected to the input terminal 25A. Thus, the current is supplied to the base of the transistor 34 through the capacitor 33 and the transistor 34 is turned on. The current is supplied to the base of the transistor 28 by the collector current of the transistor 34, so that the transistor 28 is turned on. A part of the collector current of the transistor 28 is supplied to the Zener diode 38. When the voltage of the Zener diode 38 at that time is lower than the Zener voltage, the Zener diode 38 is turned off. Therefore, the base current cannot be supplied to the transistor 34. Even when the REC switch 22 is turned on, consequently, the light 29 is not turned on.

Upon photographing by the video camera, in the case where the light according to the invention is separated from the video camera main body and used, for instance, there is a case where the user wants to give a larger light amount to an object, a case where the light is merely used as a light, or the like. An embodiment in such a case will now be described hereinbelow with reference to FIGS. 1 and 2.

A state of FIG. 1 in which the light 1, the adapter 6, and the battery (not shown) are separated from the video camera main body corresponds to a state of FIG. 2 in which the adapter circuit section 61 and the battery pack section 62 are connected. When the video light power switch 8 of the manual type provided for the adapter 6 is turned on, the output terminal 31C of the manual switch 31 is connected to the input terminal 31A. The base current is supplied from the output terminal 31C to the transistor 34, so that the transistor 34 is turned on. The transistor 28 is turned on by the collector current of the transistor 34. The transistor 40 is turned on by the collector current of the transistor 28, so that the light 29 is lit or turned on. Since the light can be separated from the video camera and used as mentioned above, it can be also applied to objects other than the video light.

A method of connecting the adapter, the battery and the light to a video camera 50 will now be described hereinbelow with reference to the drawings.

Figure 3A:
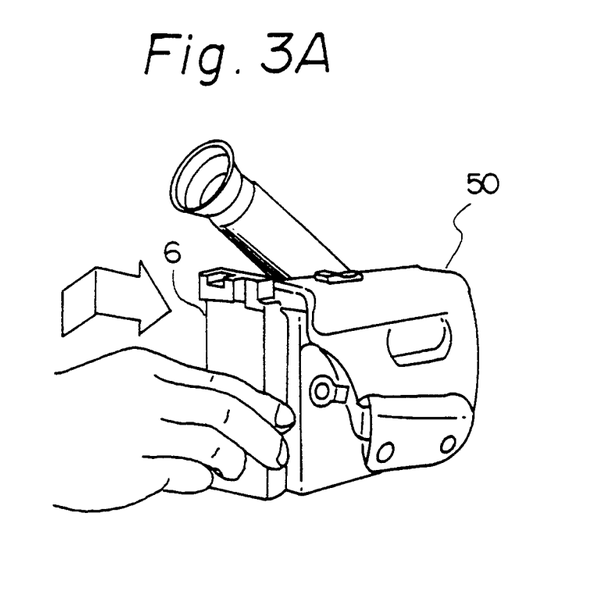
FIGS. 3A and 3B, is a perspective view showing a connection example of a video camera and the adapter.
Figure 3B:
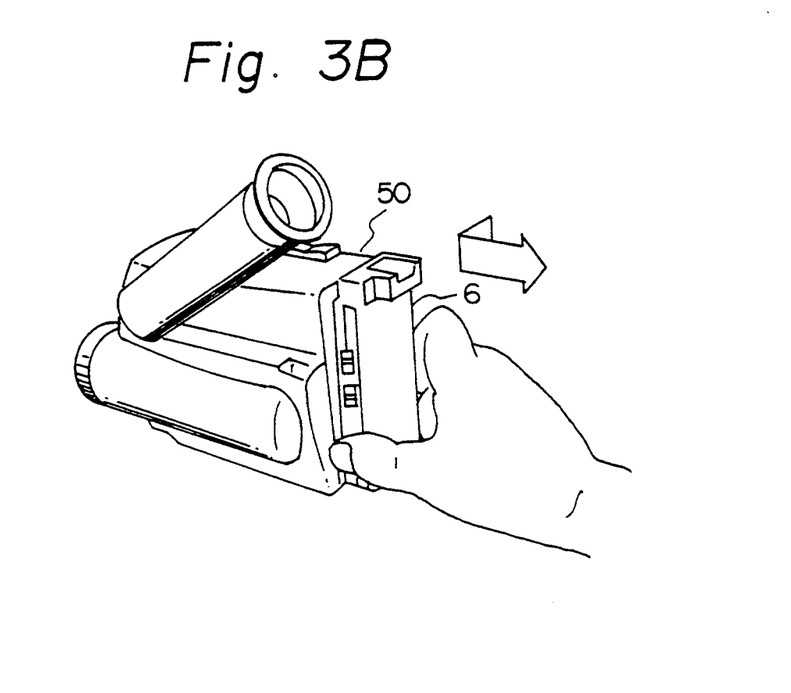

FIG. 3 shows an example when the adapter 6 is attached and detached. In the case of attaching, as shown in FIG. 3A, the right edge of the adapter 6 is matched with the battery attaching portion of the video camera 50 and is slid to the right while pushing until matching with a marker line written in the attaching portion. In the case of detaching, as shown in FIG. 3B, the adapter 6 is slid to the left and pulled to this side while pushing a battery lock of the video camera 50.

Figure 4A:
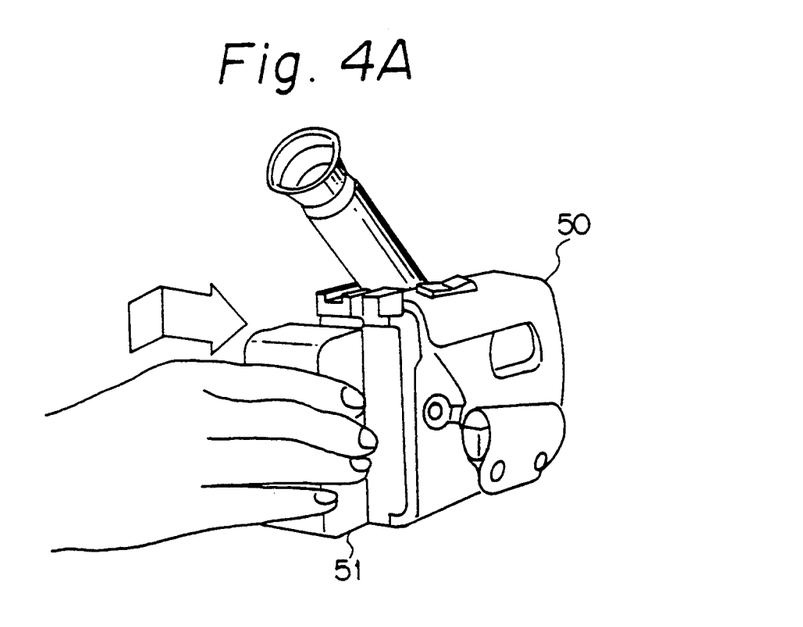
FIGS. 4A and 4B, is a perspective view showing a connection example of the video camera and a battery.
Figure 4B:
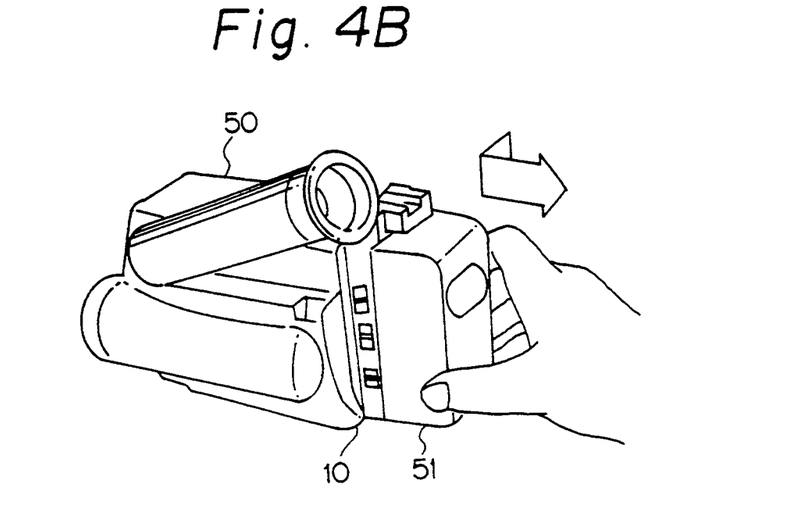

FIG. 4 shows an example when the battery is attached and detached. In the case of attaching, as shown in FIG. 4A, the right edge of the battery is matched with a marker line written on the adapter and is slid to the right while pushing. In the case of detaching, as shown in FIG. 4B, the battery is slid to the left and pulled to this side while pushing the battery lock 10 provided for the adapter 6.

Figure 5A:
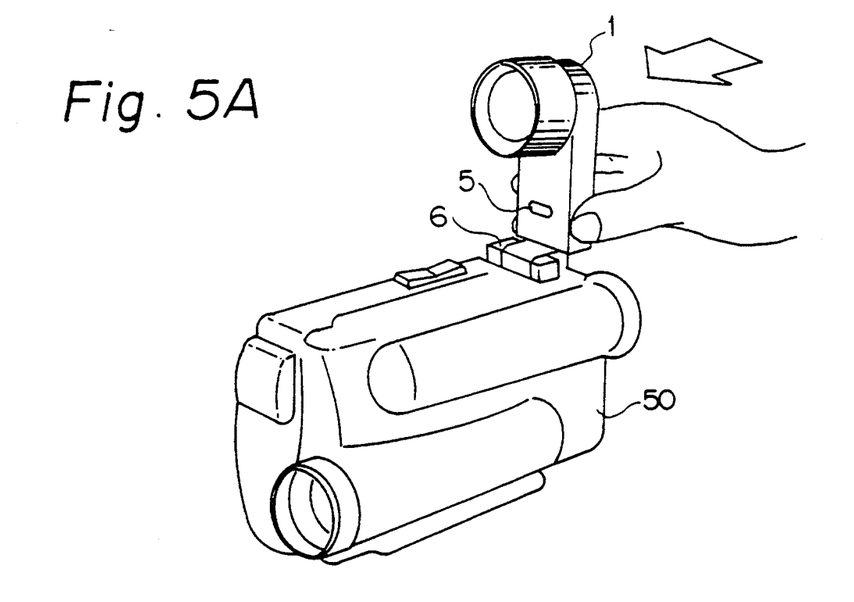
FIGS. 5A and 5B, is a perspective view showing a connection example of the video camera and the light.
Figure 5B:
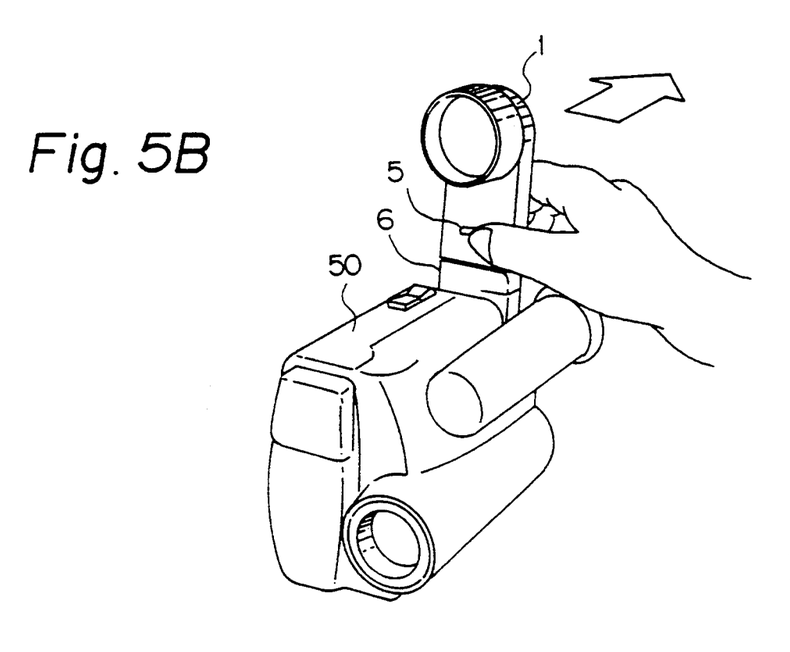

FIG. 5 shows an example when the light 1 is attached and detached to/from the adapter 6. In the case of attaching, as shown in FIG. 5A, the attaching shoe 7 provided for the adapter 6 is matched with an attaching shoe engagement portion (not shown) of the light 1 and the light 1 is pushed into the attaching shoe 7 of the adapter 6 until an attachment completion sound is heard. In the case of detaching, as shown in FIG. 5B, the light 1 is slid backward while pushing the release button 5 provided for the light 1.

In the case where the adapter 6 is not used, it is sufficient to directly connect the video camera 40 and the battery. According to the embodiment, although the amount of current flowing in the whole system has been controlled in accordance with the on/off state of the REC switch 22, for instance, it is also possible to control an amount of current flowing in the whole system in accordance with the on/off of the power on/off state switch 21.

Figure 6:
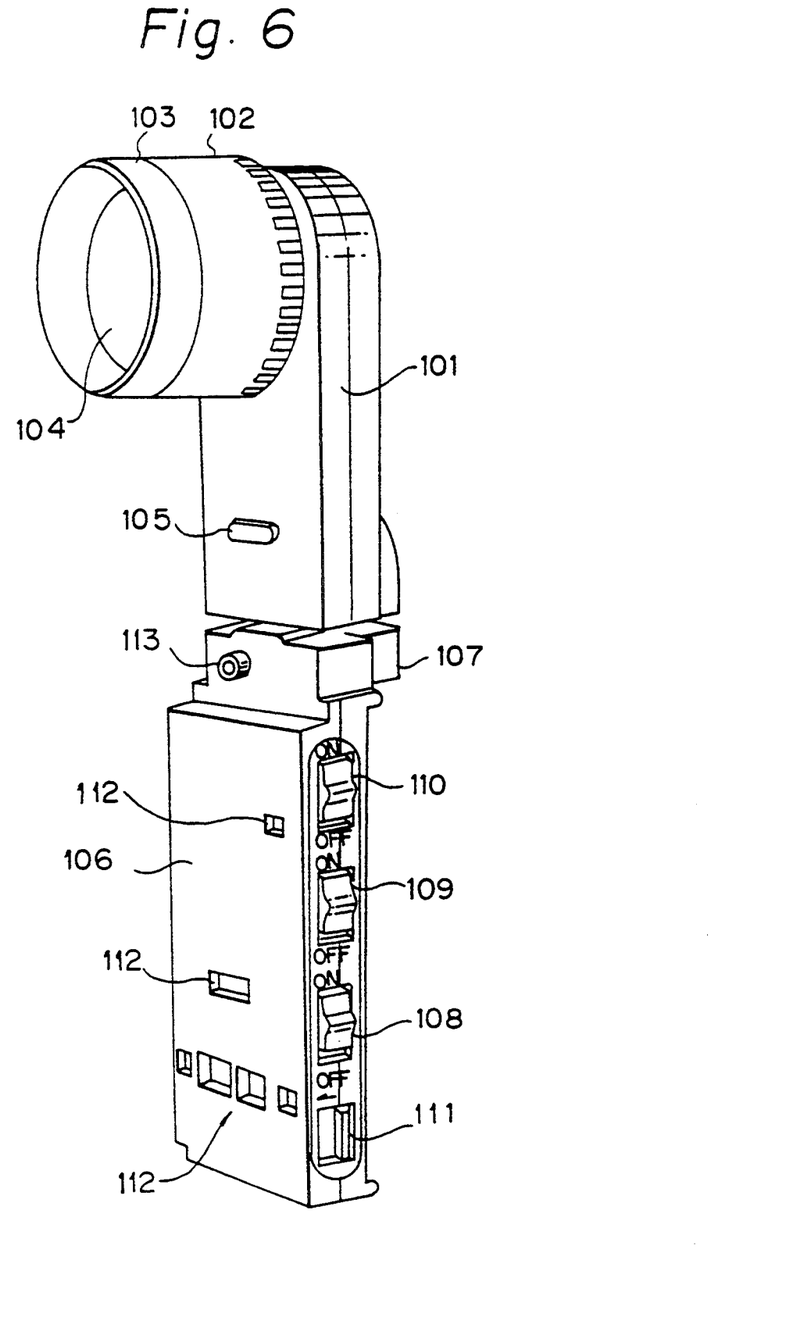
FIG. 6 is a perspective view of a light and an adapter according to another embodiment of the invention.

FIG. 6 is a perspective view showing another embodiment of the invention.

In FIG. 6, reference numeral 101 denotes a light. A lens barrel 102 is provided at one end of the light 101. A safety filter 103 is provided at a front edge of the lens barrel 102 and a halogen lamp 104 is provided therein, respectively. A release button 105 is provided in the lower portion of the light 101. Reference numeral 106 denotes an adapter. An attaching shoe 107 is provided in the upper portion on the back surface of the adapter 106. A light power switch 108, a current detection on/off switch 119, a light amount detection on/off switch 110 and a battery lock 111 are respectively provided on the side surface of the adapter 106. A contact pin engagement portion and a lock claw engagement portion which are designated by reference numeral 112 are provided in the front surface of the adapter 106 so as to coincide with a contact pin and a lock claw (both are not shown) of the video camera. In addition, a light amount sensor 113 is provided in the front surface of the adapter 106. A contact pin and a lock claw are also provided in the back surface of the adapter 106 so as to coincide with a contact pin engagement portion and a lock claw engagement portion (both are not shown) of the battery pack.

Figure 7:
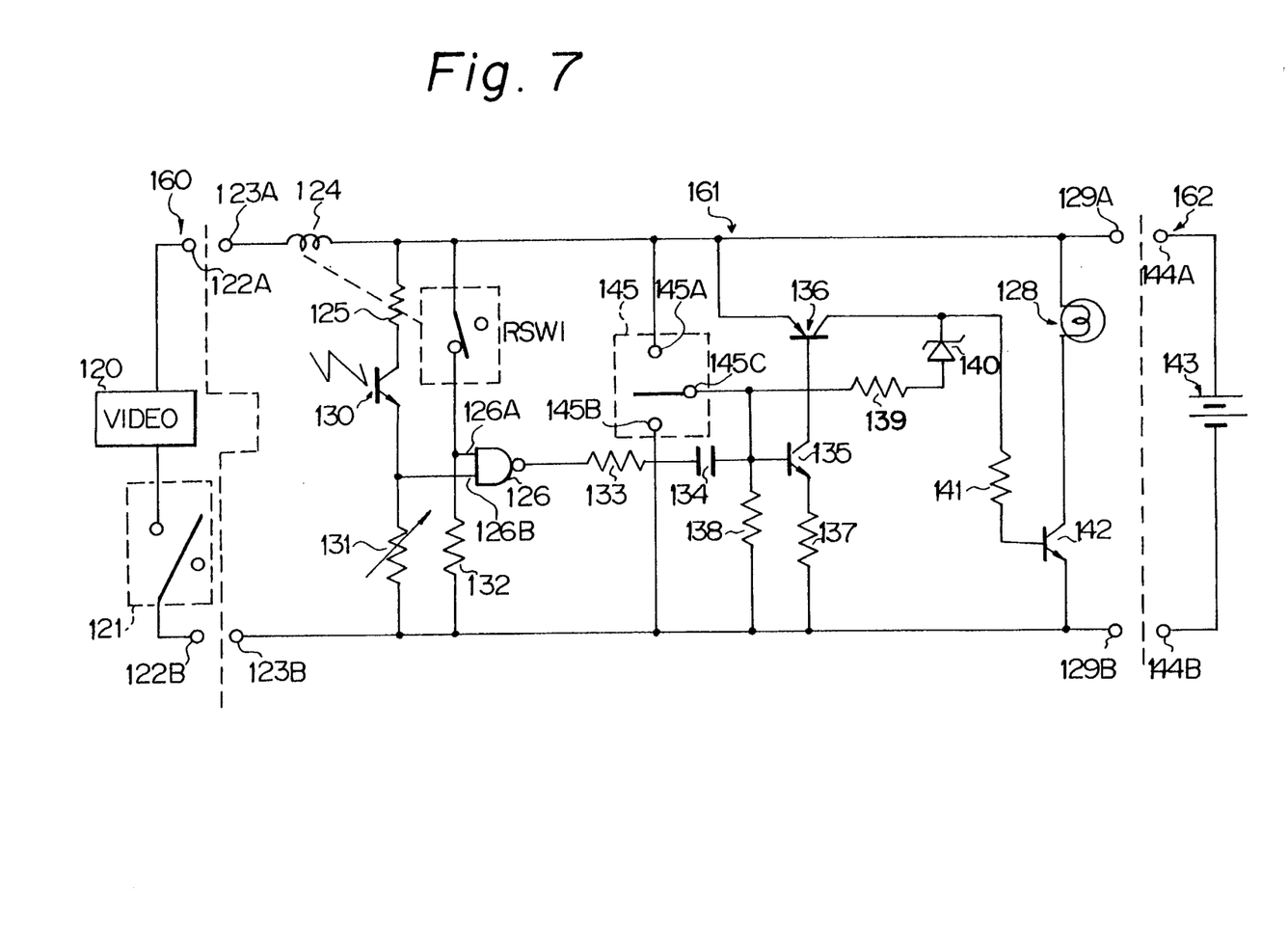
FIG. 7 is a circuit diagram of another embodiment of the invention.

FIG. 7 shows a circuit diagram of a whole system in another embodiment of the invention and comprises a video camera section 160, an adapter circuit section 161, and a battery pack circuit section 162. In the video camera section 160 in FIG. 7, reference numeral 120 denotes a video camera shown as a block. The video camera 120 has a switch 121 and two connecting terminals 122A and 122B. The switch 121 is a switch for operating the=whole system.

In the adapter circuit section 161, reference numerals 123A and 123B denote connecting terminals which are connected to the connecting terminals 122A and 122B. The terminal 123A is connected to one end of a coil 124 of a reed switch RSW1. The other end of the coil 124 is connected to one end of a resistor 125, one end of the reed switch RSW1, an input terminal of a manual switch 145, an emitter of a transistor 136, one end of a light 128, and a connecting terminal 129A, respectively. The manual switch 145 corresponds to the light power switch 108 in FIG. 6.

The other end of the resistor 125 is connected to a collector of a phototransistor 130. The phototransistor 130 corresponds to a light amount sensor 113. An emitter of the phototransistor 130 is connected to one end of a variable resistor 131 and one input terminal 126B of a NAND gate 126. A threshold level of the phototransistor 130 can be varied by the variable resistor 131. The other input terminal 126A of the NAND gate 126 and one end of a resistor 132 are connected to the other end of the reed switch RSW1. An output terminal of the NAND gate 126 is connected to a capacitor 134 through a resistor 133. The other end of the capacitor 134 is connected to a base of a transistor 135 and is also connected to one end of a resistor 138 and an output terminal 145C of the manual switch 145. A collector of the transistor,135 is connected to a base of a transistor 136 and an emitter is connected to one end of a resistor 137, respectively. The output terminal 145C of the manual switch 145 is connected to an anode of a Zener diode 140 through a resistor 139. A cathode of the Zener diode 140 is connected to a collector of the transistor 136. The collector of the transistor 136 is connected to a base of the transistor 142 through a resistor 141. A collector of the transistor 142 is connected to the other end of the video light 128.

The connecting terminal 123B is connected to the other end of the resistor 131, the other end of the resistor 132, an input terminal 145B of the manual switch 145, the other end of the resistor 138, the other end of the resistor 137, an emitter of the transistor 142, and a terminal 129B.

The battery pack circuit section 162 has a power source 143 of, e.g., 6 volts; and two connecting terminals 144A and 144B. The connecting terminals 144A and 144B are connected to the connecting terminals 129A and 129B of the adapter circuit section 161.

The operation of this embodiment of the invention will now be described hereinbelow. It is now assumed that all of the connecting terminals are connected. When the switch 121 is turned on by the user, a current flows from the power source 143 to the whole system. When the current flows in the coil 124 of the reed switch RSW1, the reed switch RSW1 is turned on. Then, the voltage level of the input terminal 126A of the NAND gate 126 becomes H (high level).

When light equal to or more than the threshold level does not enter the phototransistor 130, an output of the NAND gate 126 is H. The output H supplies a current to the base of the transistor 135 through the resistor 133 and the capacitor 134. Then the transistor 135 is turned on and the transistor 136 connected to the collector of the transistor 135 is turned on. When the transistor 136 is turned on, a current flows through its collector, so that the transistor 142 is turned on. As a result, the light 128 is turned on or lit. At the same time, when the transistor 136 is turned on, the Zener diode 140 is turned on the case where the voltage applied between both ends of the Zener diode 140 is equal to or higher than the Zener voltage. Then a current is supplied to the base of the transistor 135 through the Zener diode 140 and the resistor 139, so that the light 128 is kept in a lit state. At this time, the output terminal of the NAND gate 126 and the base of the transistor 135 are DC disconnected from each other by the capacitor 134.

On the other hand, when the light equal to or more than the threshold level enters the phototransistor 130, the output of the NAND gate 126 becomes L (low level) and the transistor 135 is turned off. As a result, all of the transistors 136 and 142 are turned off and the light 128 is also turned off. The threshold level of the phototransistor 130 is set by the variable resistor 131.

When the switch 121 is turned on and the light entering the phototransistor 130 is less than the threshold level, the case where the power supply 143 of the batter pack has only electric power which is equal to or lower than the rated power, the output of the NAND gate 126 is H. The current is supplied to the base of the transistor 135 and the transistor 135 is turned on. When the transistor 135 is turned on, the transistor 136 is turned on. A part of the collector current of the transistor 136 is supplied to the Zener diode 140. When the voltage of the Zener diode 140 at that time is lower than the Zener voltage, the Zener diode 140 is turned off. Therefore, the base current cannot be supplied to the transistor 135. Consequently, the transistor 135 is turned off and all of the transistors 136 and 142 are turned off. Thus, the overdischarge of the power supply 141 can be prevented.

The light 101 can be separated and used as described in the aforementioned embodiment. The method of connecting the adapter, the battery and the light to the video camera 120 is the same as that in the aforementioned embodiment.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A video light apparatus comprising:
 a light for lighting an object to be photographed by a video camera, said light being supplied with electric power from a battery which supplies electric power to the video camera;
 a current detecting circuit for detecting a current consumption state of the video camera, the supply of the electric power to said light being controlled on the basis of an output signal of said current detecting circuit; and
 an outer light amount detecting circuit including a variable threshold level circuit for establishing a variable threshold level and for detecting an outer light amount at the time of photographing by the video camera, said electric power to said light being controlled so as to be provided when said outer light amount is less than said variable threshold level.

2. A video light apparatus according to claim 1, further comprising a voltage detecting circuit for detecting a power source voltage of the battery, wherein when the voltage of the battery is lower than a predetermined voltage, the supply of the electric power to said light is stopped.

3. The apparatus as set forth in claim 1, wherein said threshold level circuit includes a phototransistor.

4. The video light apparatus as set forth in claim 1, wherein said variable threshold level is adjustable to be at a desired threshold level out of a plurality of threshold levels.

5. A video light apparatus comprising:
 a light for lighting an object to be photographed by a video camera, said light being supplied with electric power from a battery which supplies electric power to the video camera; and
 an outer light amount detecting circuit for detecting an outer light amount at the time of photographing by the video camera, said outer light amount detecting circuit including a variable threshold level circuit for establishing a variable threshold level and for detecting an outer light amount, said electric power to said light being controlled so that said power is provided depending on a relative value of said light to said variable threshold level.

6. A video light apparatus according claim 5, further comprising a voltage detecting circuit for detecting a power source voltage of the battery, wherein when the voltage of the battery is lower than a predetermined voltage, the supply of the electric power to said light is stopped.

7. The apparatus as set forth in claim 5, wherein said threshold level circuit includes a phototransistor for sensing said outer light and providing a signal when said light is greater than said threshold level.

8. The video light apparatus as set forth in claim 5, wherein said variable threshold level is adjustable to be at a desired threshold level out of a plurality of threshold levels.

9. The video light apparatus as set forth in claim 8, wherein said variable threshold level circuit comprises a variable resistor for adjusting said variable threshold level to said desired level out of said plurality of threshold levels.

10. A video light apparatus comprising:
 a light for lighting an object to be photographed by a video camera, said light being supplied with electric power from a battery which supplies electric power to the video camera;
 a current detecting circuit for detecting a current consumption state of the video camera; and
 an outer light amount detecting circuit, including a threshold level circuit for establishing a variable threshold level for said light amount, for detecting an outer light amount at the time of photographing by the video camera;
 the supply of the electric power to said light being controlled on the basis of output signals of said current detecting circuit and said outer light amount detecting circuit, whereupon said electric power is not provided to said light when said outer light is greater than said variable threshold level.

11. A video light apparatus according to claim 10, further comprising a voltage detecting circuit for detecting a power source voltage of the battery, wherein when the voltage of the battery is lower than a predetermined voltage, the supply of the electric power to said light is stopped.

12. The apparatus as set forth in claim 10, wherein said threshold level circuit includes a phototransistor.

13. A video light apparatus comprising:
 a light for lighting an object to be photographed by a video camera, said light being supplied with electric power from a battery which supplies electric power to the video camera;
 a voltage detecting circuit for detecting a power source voltage of the battery;
 a current detecting circuit for detecting a current consumption state of the video camera; and
 an outer light amount detecting circuit, including a threshold level circuit for establishing a variable threshold level for detecting light amount, for detecting an outer light amount at the time of photographing by the video camera;
 the supply of the electric power to said light being controlled on the basis of output signals of said voltage detecting circuit, said current detecting circuit, and said outer light amount detecting circuit.

14. The apparatus as set forth in claim 13, wherein said threshold level circuit includes a phototransistor.

15. A video light apparatus comprising:
- a light for lighting an object to be photographed by a video camera, said light being mounted between the video camera and a battery which is detachably mounted on the video camera and which supplies electric power to the video camera and said light being supplied with electric power from the battery;
- a current detecting circuit for detecting a current consumption state of the video camera, the supply of the electric power to said light being controlled on the basis of an output signal of said current detecting circuit; and
- an outer light amount detecting circuit including a variable threshold level circuit for establishing a variable threshold level and for detecting an outer light amount for producing a signal which stops said supply of electric power to said light when said outer light amount is greater than said variable threshold level for said outer light.

16. A video light apparatus according to claim 15, further comprising a voltage detecting circuit for detecting a power source voltage of the battery, wherein when the voltage of the battery is lower than a predetermined voltage, the supply of the electric power to said light is stopped.

17. A video light apparatus comprising:
- a light for lighting an object to be photographed by a video camera, said light being mounted between the video camera and a battery which is detachably mounted on the video camera and which supplies electric power to the video camera and said light being supplied with electric power from the battery; and
- an outer light amount detecting circuit, including a threshold level circuit for establishing a variable threshold level, for detecting an outer light amount at the time of photographing by the video camera;
- the supply of the electric power to said light being controlled on the basis of an output signal of said outer light amount detecting circuit, whereupon said supply of electric power is inhibited when said outer light amount is greater than said variable threshold level for said outer light as determined by said threshold level circuit.

18. A video light apparatus according to claim 17, further comprising a voltage detecting circuit for detecting a power source voltage of the battery, wherein when the voltage of the battery is lower than a predetermined voltage, the supply of the electric power to said light is stopped.

19. A video light apparatus comprising:
- a light for lighting an object to be photographed by a video camera, said light being mounted between the video camera and a battery which is detachably mounted on the video camera and which supplies electric power to the video camera and said light being supplied with electric power from the battery;
- a current detecting circuit for detecting a current consumption state of the video camera; and
- an outer light amount detecting circuit, including a variable threshold level circuit for establishing a variable threshold level, for detecting an outer light amount at the time of photographing by the video camera;
- the supply of the electric power to said light being controlled on the basis of output signals of said current detecting circuit and said outer light amount detecting circuit, wherein said supply of electric power is inhibited when said outer light is greater than said variable threshold level for said outer light as determined by said variable threshold level circuit.

20. A video light apparatus according to claim 19, further comprising a voltage detecting circuit for detecting a power source voltage of the battery, wherein when the voltage of the battery is lower than a predetermined voltage, the supply of the electric power to said light is stopped.

21. A video light apparatus comprising:
- a light for lighting an object to be photographed by a video camera, said light being mounted between the video camera and a battery which is detachably mounted on the video camera and which supplies electric power to the video camera and said light being supplied with electric power from the battery;
- a voltage detecting circuit for detecting a power source voltage of the battery;
- a current detecting circuit for detecting a current consumption state of the video camera; and
- an outer light amount detecting circuit, including a variable threshold level circuit for establishing a variable threshold level, for detecting an outer light amount at the time of photographing by the video camera;
- the supply of the electric power to said light being controlled on the basis of output signals of said voltage detecting circuit, said current detecting circuit, and said outer light amount detecting circuit.

22. A video light apparatus comprising:
- a light for lighting an object to be photographed by a video camera, said light being mounted between the video camera and a battery which is detachably mounted on the video camera and which supplies electric power to the video camera and said light being supplied with electric power from the battery;
- a current detecting circuit for detecting a current consumption state of the video camera, the supply of the electric power to said light being controlled on the basis of an output signal of said current detecting circuit;
- an outer light amount detecting circuit including a variable threshold level circuit for detecting an outer light amount for producing a signal which stops said supply of electric power to said light when said outer light amount is greater than a threshold level for said outer light, wherein said outer light amount detecting circuit comprises a phototransistor.

* * * * *